US012764458B2

(12) United States Patent
Lin et al.

(10) Patent No.: US 12,764,458 B2
(45) Date of Patent: Oct. 13, 2026

(54) DIRECTIONAL MICROPHONE RECEIVER AND SOUND DEVICE

(71) Applicant: YEALINK (XIAMEN) NETWORK TECHNOLOGY CO., LTD., Xiamen (CN)

(72) Inventors: Yixiang Lin, Xiamen (CN); Jinyu Gao, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 347 days.

(21) Appl. No.: 18/209,474

(22) Filed: Jun. 13, 2023

(65) Prior Publication Data

US 2023/0403502 A1 Dec. 14, 2023

(30) Foreign Application Priority Data

Jun. 13, 2022 (CN) ......................... 202221468647.3

(51) Int. Cl.
*H04R 1/34* (2006.01)
*H04R 1/04* (2006.01)
*H04R 1/28* (2006.01)
*H04R 19/01* (2006.01)

(52) U.S. Cl.
CPC ............... *H04R 1/342* (2013.01); *H04R 1/04* (2013.01); *H04R 1/2807* (2013.01); *H04R 1/2873* (2013.01); *H04R 19/016* (2013.01)

(58) Field of Classification Search
CPC ........ H04R 1/342; H04R 1/04; H04R 1/2807; H04R 1/2873; H04R 19/016
USPC ......................... 381/357, 351, 345, 337, 338
See application file for complete search history.

(56) References Cited

U.S. PATENT DOCUMENTS 8,509,459 B1 * 8/2013 Isvan .................. H04R 19/016 381/357
9,357,292 B2 * 5/2016 Huang .................. H04R 1/406
9,380,377 B2 * 6/2016 Jingming ............... H04R 1/342
2010/0054493 A1 * 3/2010 Lin ..................... H01H 9/0228 381/74
2014/0112518 A1 * 4/2014 Lee ......................... H04R 1/04 381/365

(Continued)

FOREIGN PATENT DOCUMENTS

CN 106162471 A * 11/2016 .............. H04R 9/08

*Primary Examiner* — Carolyn R Edwards
*Assistant Examiner* — Dylan Maguire Neece

(57) ABSTRACT

Disclosed are a directional microphone receiver and sound device. The directional microphone receiver includes: a housing and an electret condenser microphone (ECM), where the housing has a first tuning chamber and a second tuning chamber; a side of the housing is provided with a first sound transmission hole and a second sound transmission hole; the first tuning chamber communicates with the first sound transmission hole, and the second tuning chamber communicates with the second sound transmission hole; the ECM is provided between the first tuning chamber and the second tuning chamber, and has a diaphragm, an upper chamber, and a lower chamber; the diaphragm is provided between the upper chamber and the lower chamber; and the lower chamber communicates with the first tuning chamber, and the upper chamber communicates with the second tuning chamber.

15 Claims, 3 Drawing Sheets

(56) References Cited

U.S. PATENT DOCUMENTS

| | | | | |
|---|---|---|---|---|
| 2019/0028786 | A1* | 1/2019 | Grinnip, III | H04R 9/08 |
| 2021/0160629 | A1* | 5/2021 | Qi | G10K 9/13 |

* cited by examiner

DIRECTIONAL MICROPHONE RECEIVER AND SOUND DEVICE

CROSS-REFERENCE TO RELATED APPLICATIONS

The present application claims the benefit of Chinese Patent Application No. 202221468647.3 filed on Jun. 13, 2022, the contents of which are hereby incorporated by reference.

TECHNICAL FIELD

The present disclosure relates to the technical field of microphones, and in particular to a directional microphone receiver and a sound device.

BACKGROUND

For products that use conventional standard directional microphones, their enclosures are designed according to design specifications of the standard directional microphones. The conventional standard microphones include electret condenser microphones (ECMs) and micro-electro-mechanical system (MEMS) microphones. Directional MEMS microphones have a low signal-to-noise ratio (SNR) due to a small size of the diaphragm. For directional ECMs, sound holes are provided on an upper portion and a lower portion of a product enclosure, resulting in many defects and limitations. For example, since there are bumps on the product enclosure of the directional ECM, more or bigger sound holes are needed to improve directionality, resulting in low overall structural strength, poor appearance and integrity, and high dustproof costs. Besides, the sound holes on the upper portion and the lower portion of the directional ECM lead to a great restriction on a site layout. For example, the product can only be placed on a desk and cannot be completely embedded in the desk. However, in order to ensure penetration of the sound, the directional ECMs on the market have to adopt the structure of sound holes arranged on the upper portion and the lower portion.

Therefore, there is a need for a directional microphone receiver to solve problems caused by the structure of the sound holes arranged on the upper portion and the lower portion of the directional ECM.

SUMMARY

An objective of the present disclosure is to provide a directional microphone receiver with adjustable pickup patterns.

In order to achieve the above objective, the present disclosure provides a directional microphone receiver, including:

- a housing, having a first tuning chamber and a second tuning chamber, where a surface of the housing is provided with a first sound transmission hole and a second sound transmission hole; and the first tuning chamber communicates with the first sound transmission hole, and the second tuning chamber communicates with the second sound transmission hole; and
- an electret condenser microphone (ECM), provided between the first tuning chamber and the second tuning chamber, and separating the first tuning chamber and the second tuning chamber, where the ECM has a diaphragm, an upper chamber, and a lower chamber; the diaphragm is provided between the upper chamber and the lower chamber; and the lower chamber communicates with the first tuning chamber, and the upper chamber communicates with the second tuning chamber.

Optionally, the ECM may include: a microphone shell, a printed circuit board (PCB) provided in the microphone shell, and a plate parallel to the PCB; and the diaphragm may be provided in the microphone shell;

- an inner wall of the microphone shell, the diaphragm, and the plate enclose the lower chamber; and the plate may be provided with a first sound receiving hole, which communicates with the lower chamber and the first tuning chamber; and
- the inner wall of the microphone shell, the diaphragm, and the PCB enclose the upper chamber; and the PCB may be provided with a second sound receiving hole, which communicates with the upper chamber and the second tuning chamber.

Optionally, the ECM further may include a damping member, which covers the first sound transmission hole or the second sound transmission hole or the first sound receiving hole or the second sound receiving hole.

Optionally, the housing may include: a case body and a cover plate; one side of the case body may be provided with a side window; the cover plate covers the side window; and the first sound transmission hole and the second sound transmission hole may be provided on the cover plate Optionally, the housing may include: a case body and a cover plate; one side of the case body may be provided with a side window; the cover plate covers the side window; the first sound transmission hole may be provided on the cover plate, and the second sound transmission hole may be provided on a side of the case body, which may be different from the side where the side window may be provided; and an extension direction of the first sound transmission hole may be perpendicular to an extension direction of the second sound transmission hole.

Optionally, the directional microphone receiver further may include a mounting plate, which may be provided in the case body; an upper edge of the mounting plate may be connected to the cover plate, and there may be a gap between a lower edge of the mounting plate and a bottom wall of the case body; and a side of the microphone shell may be connected to an inner side wall of the case body and the mounting plate.

Optionally, the case body may be a sound transmission cover, or may be composed of a plurality of sound transmission brackets.

Optionally, the microphone shell may be in interference fit or may be bonded via curable adhesive with the case body and the mounting plate.

Optionally, the cover plate may be a steel sheet with a thickness of 0.2 mm.

Optionally, the case body may be made of an elastic material or a plastic material.

A sound device includes the directional microphone receiver according to any one of the above paragraphs.

Compared with the prior art, the directional microphone receiver and sound device according to the embodiments of the present disclosure have the following beneficial effects:

By adjusting the volume of the first tuning chamber and the second tuning chamber and adjusting the distance between the first sound transmission hole and the second sound transmission hole, the embodiments of the present disclosure can realize various pickup patterns such as shapes of figure-8, cardioid, super-cardioid, and shotgun. In addition, the first tuning chamber and the second tuning chamber are arranged inside the housing 1 and outside the ECM. Thus, different pickup patterns of the microphone receiver can be achieved by adjusting the volume of the tuning chamber in the housing and the position of the sound transmission hole on the surface of the housing, and there is no need to adjust the internal structure of the ECM.

Figure 1:
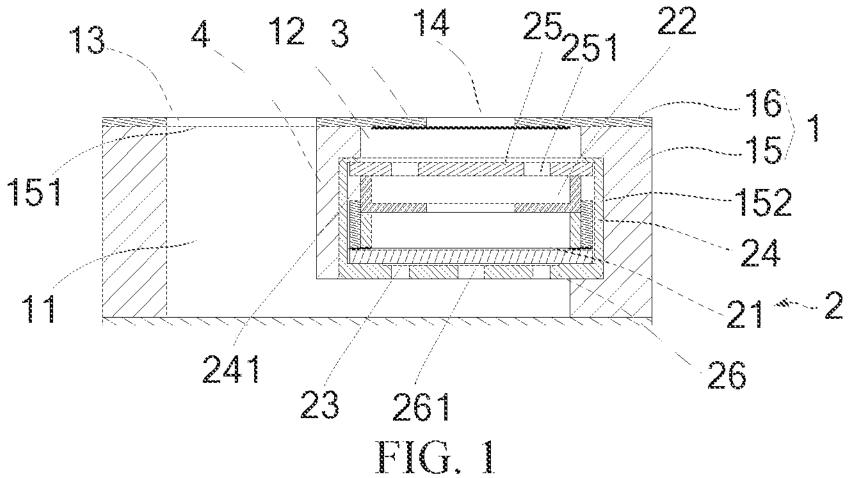
FIG. 1 is a sectional view of a directional microphone receiver according to an embodiment of the present disclosure.

Reference Signs: 100: directional microphone receiver; 1: housing; 11: first tuning chamber; 12: second tuning chamber; 13: first sound transmission hole; 14: second sound transmission hole; 15: case body; 151: side window; 152: inner side wall; 16: cover plate; 2: electret condenser microphone (ECM); 21: diaphragm; 22: upper chamber; 23: lower chamber; 24: microphone shell; 241: inner wall of the microphone shell; 25: printed circuit board (PCB); 251: second sound receiving hole; 26: plate; 261: first sound receiving hole; 3: damping member; 4: mounting plate; 5: cover body; 51: first opening; 52: second opening; 53: third opening; 6: pin; and 7: dispensing adhesive.

DETAILED DESCRIPTION

The specific implementations of the present disclosure are described in further detail below with reference to the drawings and embodiments. The following embodiments are used to illustrate the present disclosure, but are not used to limit the scope of the present disclosure.

First, it should be noted that the orientation terms such as "top", "bottom", "upward", and "downward" mentioned herein are defined with respect to the directions in the drawings. They are relative concepts and may change with their locations and practical states. Therefore, these and other orientation terms should not be construed as restrictive terms.

It should be noted that the term "include" does not exclude other elements or steps, and "a" or "an" does not exclude a plural.

In addition, it should also be pointed out that any single technical feature described or implied in the embodiments or any single technical feature shown or implied in the drawings (or their equivalents) can still be combined with each other to obtain other embodiments of the present disclosure that are not directly mentioned herein.

It should also be understood that the terms such as "first" and "second" used herein are intended to describe various information, but the information is not limited herein, and these terms are only intended to distinguish the same type of information from each other. For example, without departing from the scope of the present disclosure, "first" information may also be referred to as "second" information, and similarly, "second" information may be referred to as "first" information.

It should be noted that the same reference signs refer to the same or substantially the same components in different drawings.

As shown in FIGS. 1, 2A, 2B, and 2C, a preferred embodiment of the present disclosure provides a directional microphone receiver 100. It includes: a housing 1 and an electret condenser microphone (ECM) 2.

The housing 1 has a first tuning chamber 11 and a second tuning chamber 12. The housing 1 is provided with a first sound transmission hole 13 and a second sound transmission hole 14. The first tuning chamber 11 communicates with the first sound transmission hole 13, and the second tuning chamber 12 communicates with the second sound transmission hole 14.

The ECM 2 is provided between the first tuning chamber 11 and the second tuning chamber 12, and separates the first tuning chamber 11 and the second tuning chamber 12. The ECM 2 has a diaphragm 21, an upper chamber 22, and a lower chamber 23. The diaphragm 21 is provided between the upper chamber 22 and the lower chamber 23. The lower chamber 23 communicates with the first tuning chamber 11, and the upper chamber 22 communicates with the second tuning chamber 12.

An external sound signal may enter the lower chamber 23 of the ECM 2 from the first sound transmission hole 13 through the first tuning chamber 11, and enter the upper chamber 22 of the ECM 2 from the second sound transmission hole 14 through the second tuning chamber 12. That is, by adjusting a volume of the first tuning chamber 11 and the second tuning chamber 12 and adjusting a distance between the first sound transmission hole 13 and the second sound transmission hole 14, a sound pressure on two sides of the diaphragm 21 is adjusted. In this way, the microphone receiver of the present disclosure can achieve different pickup patterns. By adjusting the volume of the first tuning chamber 11 and the second tuning chamber 12 and adjusting the distance between the first sound transmission hole 13 and the second sound transmission hole 14, the directional microphone receiver 100 of the present disclosure can realize various pickup patterns such as shapes of figure-8, cardioid, super-cardioid, and shotgun. In addition, the first tuning chamber 11 and the second tuning chamber 12 are arranged inside the housing 1 and outside the ECM 2. Thus, different pickup patterns of the microphone receiver can be achieved by adjusting the volume of the tuning chamber in the housing 1 and the position of the sound transmission hole on the surface of the housing 1, and there is no need to adjust the internal structure of the ECM 2.

In this embodiment, a shortest distance between the first sound transmission hole 13 and the second sound transmission hole 14 is greater than or equal to 12 mm. The shortest distance is a distance between two closest sides of the first sound transmission hole 13 and the second sound transmission hole 14, indicated by d in FIG. 1. The shortest distance between the sound transmission holes ensures the effective bandwidth and frequency response characteristics of the microphone receiver, so as to achieve desired sound quality.

In this embodiment, the housing 1 includes a case body 15 for accommodating the ECM. A side window 151 is provided on one side of the case body 15. The housing 1 further includes a cover plate 16 covering the side window 151. The case body 15 may be square, polygonal, or cylindrical, etc. The case body 15 may be a sound transmission cover, or may be composed of a plurality of sound transmission brackets. For example, the case body 15 is a square case body composed of a square tube enclosed by four rectangular sound transmission brackets and a sound transmission bracket located at a bottom of the four sound transmission brackets, and the cover plate 16 is provided on a top of the sound transmission brackets.

The present disclosure further provides a sound device with the directional microphone receiver 100, including a cover body 5 and the directional microphone receiver 100.

The positional relationship between the first sound transmission hole 13 and the second sound transmission hole 14 in the sound device of the present disclosure will be described below with reference to multiple specific embodiments.

Figure 2A:
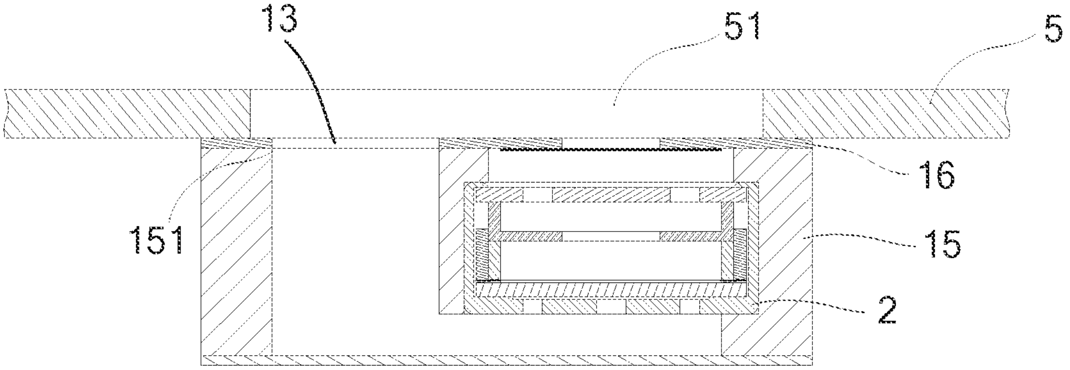
FIG. 2A is a structural view of one Solution in an embodiment of the present disclosure.
Figure 2B:
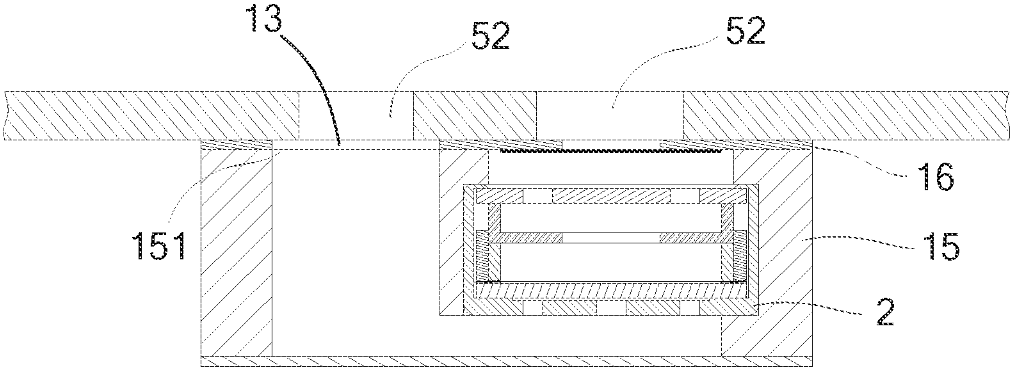
FIG. 2B is a structural view of another Solution in an embodiment of the present disclosure.
Figure 2C:
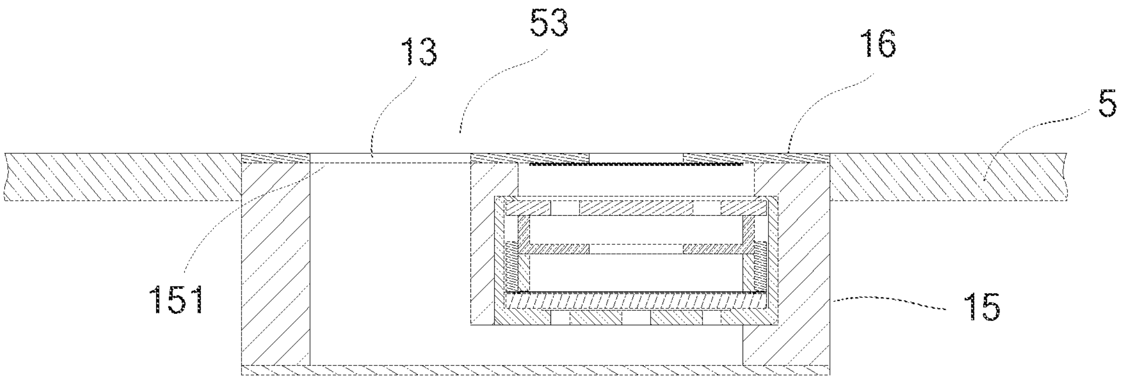
FIG. 2C is a structural view of another Solution in an embodiment of the present disclosure.
Figure 3:
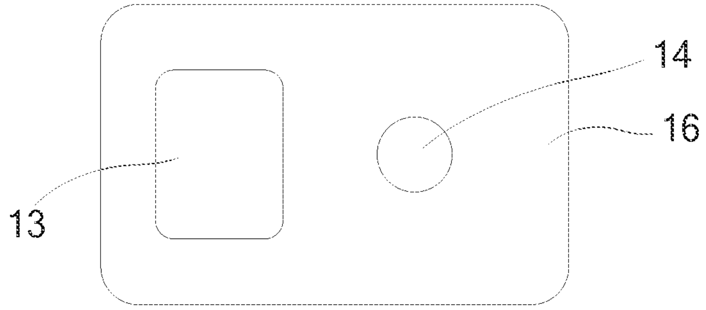
FIG. 3 is a top view of another Solution in an embodiment of the present disclosure.

At first with reference to FIGS. 1 to 3 some embodiment that wherein can realize according to the directional microphone receiver of present disclosure example are described. The first sound transmission hole 13 and the second sound transmission hole 14 are provided on the cover plate 16. The directionality of the directional microphone receiver 100 is adjusted by adjusting the distance between the first sound transmission hole 13 and the second sound transmission hole 14. The first sound transmission hole 13 and the second sound transmission hole 14 are located in a same plane. Therefore, the cover body 5 of the directional microphone receiver 100 only needs to be provided with an opening matching the first sound transmission holes 13 and the second sound transmission holes 14. In this way, the present disclosure only needs to expose the first sound transmission hole 13 and the second sound transmission hole 14 to the cover body 5 to allow external sound to enter the first tuning chamber 11 from the first sound transmission hole 13. The cover body 5 of the directional microphone receiver 100 may be a desktop or an enclosure of a product with the directional microphone receiver 100, such as a desktop microphone or a microphone of other type.

The solutions of the cover body 5 and the cover plate 16 in the above embodiments will be described in detail below.

One Solution 1 in embodiment: As shown in FIG. 2A, the cover plate 16 is provided on an inner wall of the cover body 5. The cover body 5 is provided with a first opening 51 in a vertical direction of the first sound transmission hole 13 and the second sound transmission hole 14. A projected area of the first opening 51 in the vertical direction is greater than a sum of projected areas of the first sound transmission hole 13 and the second sound transmission hole 14 in the vertical direction.

Another Solution in embodiment: As shown in FIG. 2B, the cover plate 16 is provided on the inner wall of the cover body 5. The cover body 5 is provided with two second openings 52 in the vertical direction of the first sound transmission hole 13 and the second sound transmission hole 14. The two second openings 52 are arranged vertically above the first sound transmission hole 13 and the second sound transmission hole 14, respectively.

Another Solution in embodiment: As shown in FIG. 2C, the cover body 5 is provided with a third opening 53, and the cover plate 16 of the directional microphone receiver 100 is embedded in the third opening 53. That is, the cover plate 16 is flush with a desktop or an enclosure, and the housing 1 is embedded and fixed in the third opening 53 of the cover body 5.

The cover body 5 may be the desktop or the enclosure of a product with the directional microphone receiver 100, such as a desktop microphone or a microphone of other type. The directional microphone receiver 100 of the present disclosure can be concealed under the cover body 5 or embedded in the third opening 53 of the cover body 5. The design can realize beautiful site layout without extra bumps, and avoids large-area hollows on the enclosure, ensuring the structural strength of the product.

Figure 4:
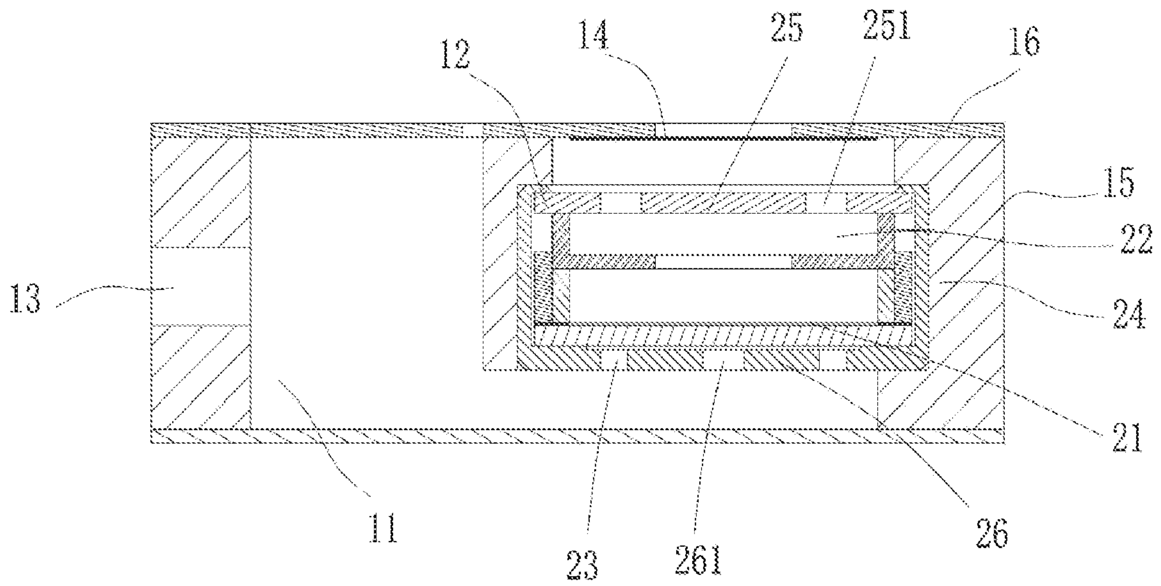
FIG. 4 is a structural view of a first sound transmission hole and a second sound transmission hole in another Embodiment of the present disclosure.
Figure 5:
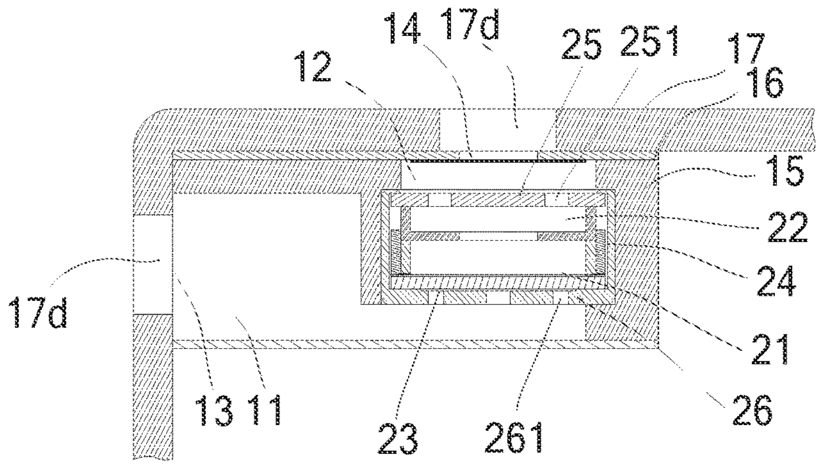
FIG. 5 is another structural view of the first sound transmission hole and the second sound transmission hole in another Embodiment of the present disclosure.

In some example, refer to FIGS. 4 and 5, the difference from above embodiment is that the first sound transmission holes 13 and the second sound transmission holes 14 are not both arranged on the cover plate 16. The first sound transmission hole 13 is provided on the case body 15, and extension directions of the first sound transmission hole 13 and the second sound transmission hole 14 are perpendicular to each other.

Referring to FIGS. 4 and 5, the second sound transmission hole 14 is provided on the cover plate 16, and the first sound transmission hole 13 is provided on a side wall of the case body 15. The extension direction of the first sound transmission hole 13 is perpendicular to the extension direction of the second sound transmission hole 14. In this way, the directional microphone receiver 100 of the present disclosure has more design freedom. The cover body 5 of the directional microphone receiver 100 is provided with two openings 17*d* matching the first sound transmission hole 13 and the second sound transmission hole 14. An opening 17*d* matching the first sound transmission hole 13 is located on a side of the cover body 5, and an opening 17*d* matching the second sound transmission hole 14 is located on a top surface of the cover body 5. In this way, the directional microphone receiver 100 of the present disclosure can adapt to more product appearances. The cover body 5 of the directional microphone receiver 100 may be a desktop on which the directional microphone receiver 100 is placed, and may also be an enclosure of a product with the directional microphone receiver 100, such as a desktop microphone or a microphone of other type.

In the above embodiments, the acoustic performance of the directional microphone receiver 100 of the present disclosure can be adjusted by adjusting the size and distance of the first sound transmission hole 13 and the second sound transmission hole 14. When the first sound transmission hole 13 and the second sound transmission hole 14 are located in the same plane or are perpendicular to each other, the directional microphone receiver does not need to arch a bottom housing or provide a bump locally for pickup, thereby ensuring the miniaturization and aesthetics of the overall housing. In the above two embodiments, the ECM 2 is provided between the first tuning chamber 11 and the second tuning chamber 12, and separates the first tuning chamber 11 and the second tuning chamber 12. The ECM sensor 2 may be fixed in the housing 1 in various ways. The design will be described below in conjunction with specific methods.

As shown in FIG. 1, the ECM 2 may be fixed by a mounting plate 4. When the case body 15 is in the shape of a square box composed of a square tube enclosed by four rectangular sound transmission brackets and a sound transmission bracket located at the bottom of the four sound transmission brackets, the mounting plate 4 is provided in the case body 15. An upper edge of the mounting plate 4 is connected to the cover plate 16, and there is a gap between a lower edge of the mounting plate 4 and the bottom sound transmission bracket of the case body 15. The ECM 2 is provided between the mounting plate 4 and one side sound transmission bracket of the case body 15, and the ECM 2 is connected to the mounting plate 4 and an inner wall 152 of the one side sound transmission bracket of the case body 15. In this way, a section of the first tuning chamber 11 is L-shaped, and a section of the second tuning chamber 12 is square. That is, a side of a microphone shell 24 is connected to the inner side wall of the case body 15 and the mounting plate 4, such that the mounting plate 4 and the microphone shell 24 divide the case body 15 into the first tuning chamber 11 and the second tuning chamber 12 which are isolated from each other.

In order to improve the sealing between the first tuning chamber 11 and the second tuning chamber 12, the side of the microphone shell 24 is in interference fit or is bonded via curable adhesive with the inner wall of the case body 15 and the mounting plate 4. The design ensures isolation between the first tuning chamber 11 and the second tuning chamber 12.

Figure 7:
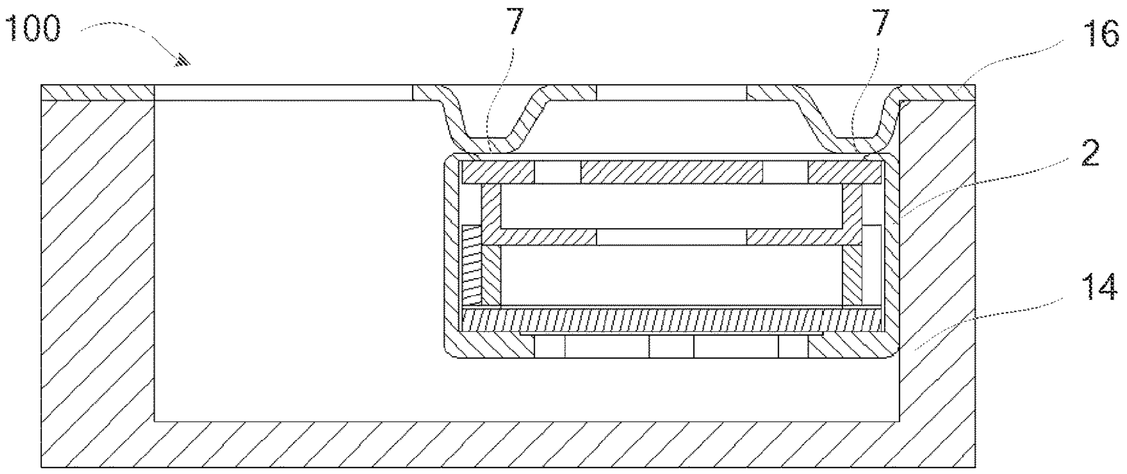
FIG. 7 is a structural view of the cover plate and the ECM that are connected through a dispensing adhesive according to an embodiment of the present disclosure.

As shown in FIG. 7, when the case body 15 is a sound transmission cover, the ECM 2 is fixed on the cover plate 16 through a dispensing adhesive 7. The second tuning chamber 12 is formed between an upper surface of the microphone shell 24 of the ECM 2 and the cover plate 16 through a dispensing adhesive. The cover plate 16 may be made of an elastic material or a plastic material. For example it may be a silicone rubber bracket or a metal bracket. In addition, the case body 15 is fixed on the cover plate 16 by dispensing adhesives or double-sided adhesive and covers the ECM to form the first tuning chamber 11.

Figure 6:
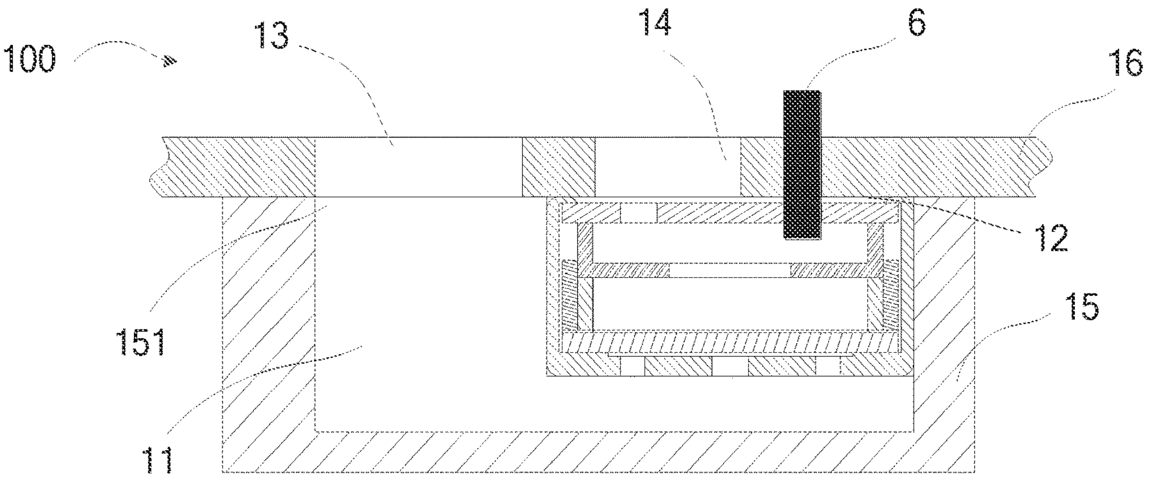
FIG. 6 is a schematic view of a connection relationship of a cover plate and an electret condenser microphone (ECM) according to an embodiment of the present disclosure.

As shown in FIG. 6, the case body 15 may be a sound transmission cover. The ECM 2 is welded and fixed on the cover plate 16 through a pin 6, and the second tuning chamber 12 is formed between the upper surface of the ECM 2 and the cover plate 16 through a dispensing adhesive. The cover plate 16 may be a printed circuit board (PCB). In addition, the case body 15 is fixed on the cover plate 16 by dispensing adhesives or double-sided adhesive and covers the ECM 2 to form the first tuning chamber 11.

Further, the present disclosure can adjust the sound pressure on two sides of the diaphragm 21 by changing the volume of the first tuning chamber 11 and the second tuning chamber 12, so as to realize the directionality of the microphone receiver of the present disclosure. The volume of the tuning chamber may be changed by changing the size of the case body 15, such as changing the distance between the side sound transmission brackets and the distance between the ECM and the bottom sound transmission bracket, etc. The first tuning chamber 11 and the second tuning chamber 12 are arranged inside the housing 1 and outside the ECM 2. Therefore, it is not necessary to adjust the internal structure of the ECM 2, and the different pickup patterns of the microphone receiver can be adjusted by adjusting the volume of the tuning chamber in the housing 1.

In a possible embodiment, as shown in FIG. 1, the ECM 2 includes: the microphone shell 24, a PCB 25, and a plate 26. The diaphragm 21 is provided in the microphone shell 24. The PCB 25 is provided in the microphone shell 24, the plate 26 is parallel to the PCB 25, and the PCB 25 and the plate 26 are respectively arranged on upper and lower sides of the diaphragm 21.

Referring to FIG. 1, the upper chamber 22 is enclosed by an inner wall 241 of the microphone shell, the diaphragm 21, and the PCB 25. The PCB 25 is provided with a second sound receiving hole 251. The second sound receiving hole 251 communicates with the upper chamber 22 and the second tuning chamber 12 respectively. In this way, the external sound signal can enter the second sound receiving hole 251 from the second sound transmission hole 14 through the second tuning chamber 12, and then enter the upper chamber 22 of the ECM 2.

The inner wall of the microphone shell 24, the diaphragm 21, and the plate 26 enclose the lower chamber 23. The plate 26 is provided with a first sound receiving hole 261. The first sound receiving hole 261 is connected to the lower chamber 23 and the first tuning chamber 11. In this way, the external sound signal can enter the first sound receiving hole 261 from the first sound transmission hole 13 through the first tuning chamber 11, and then enter the lower chamber 23 of the ECM 2.

The directional microphone receiver 100 further includes: a damping member 3. The damping member 3 covers a surface of the first sound transmission hole 13 or the second sound transmission hole 14 or the first sound receiving hole 261 or the second sound receiving hole 251 or the plate 26. The acoustic performance can be adjusted by adjusting an acoustic resistance parameter of the damping element 3. When the damping member 3 covers the surface of the first sound transmission hole 13 or the second sound transmission hole 14, there is no need to adjust the internal structure of the ECM 2, and the different pickup patterns of the microphone receiver can be adjusted by adjusting the position of the damping member 3.

In a possible embodiment, the cover plate 16 is a steel sheet with a thickness of 0.2 mm. The cover plate 16 of the present disclosure ensures the rigidity and the effective frequency of the directionality.

In a possible embodiment the case body 15 is made of an elastic material or a plastic material, so as to improve the sealing performance between the sound transmission cover and the microphone shell 24.

To sum up, the embodiments of the present disclosure provide a directional microphone receiver 100 and a sound device. The present disclosure can adjust the volume of the first tuning chamber 11 and the second tuning chamber 12, the distance between the first sound transmission hole 13 and the second sound transmission hole 14, and the position of the damping member 3, so as to realize a variety of pickup patterns such as shapes of figure-8, cardioid, super-cardioid and shotgun. The directional microphone receiver 100 of the present disclosure can be embedded in the desktop or the enclosure or flush with the surface thereof, and only the first sound transmission hole 13 and the second sound transmission hole 14 need to be exposed on the desktop. The directional microphone receiver 100 of the present disclosure can be concealed in the desktop, which makes the site layout beautiful, and avoids the configuration of a large-area hollow on the enclosure, thereby ensuring the structural strength of the product.

The above described are merely preferred implementations of the present disclosure. It should be noted that those of ordinary skill in the art may further make several improvements and modifications without departing from the principle of the present disclosure, but such improvements and modifications should be deemed as falling within the protection scope of the present disclosure.

The invention claimed is:

1. A directional microphone receiver, comprising:

a housing, having a first tuning chamber and a second tuning chamber, wherein a surface of the housing is provided with a first sound transmission hole and a second sound transmission hole; and the first tuning chamber communicates with the first sound transmission hole, and the second tuning chamber communicates with the second sound transmission hole; and an electret condenser microphone (ECM), provided between the first tuning chamber and the second tuning chamber, and separating the first tuning chamber and the second tuning chamber, wherein the ECM has a diaphragm, an upper chamber, and a lower chamber; the diaphragm is provided between the upper chamber and the lower chamber; and the lower chamber communicates with the first tuning chamber, and the upper chamber communicates with the second tuning chamber;

wherein the ECM comprises: a microphone shell, a printed circuit board (PCB) provided in the microphone shell, and a plate parallel to the PCB; and the diaphragm is provided in the microphone shell;

an inner wall of the microphone shell, the diaphragm, and the plate enclose the lower chamber; and the plate is provided with a first sound receiving hole, which communicates with the lower chamber and the first tuning chamber respectively; and the inner wall of the microphone shell, the diaphragm, and the PCB enclose the upper chamber; and the PCB is provided with a second sound receiving hole, which communicates with the upper chamber and the second tuning chamber respectively;

wherein the ECM further comprises a damping member, which covers the first sound transmission hole, the second sound transmission hole, the first sound receiving hole, or the second sound receiving hole.

2. The directional microphone receiver according to claim 1, wherein the housing comprises: a case body and a cover plate; one side of the case body is provided with a side window; the cover plate covers the side window; and the first sound transmission hole and the second sound transmission hole are provided on the cover plate.

3. The directional microphone receiver according to claim 1, wherein the housing comprises: a case body and a cover plate; one side of the case body is provided with a side window; the cover plate covers the side window; the first sound transmission hole is provided on the cover plate, and the second sound transmission hole is provided on a side of the case body, which is different from the side where the side window is provided; and an extension direction of the first sound transmission hole is perpendicular to an extension direction of the second sound transmission hole.

4. The directional microphone receiver according to claim 2, wherein the directional microphone receiver further comprises a mounting plate, which is provided in the case body; an upper edge of the mounting plate is connected to the cover plate, and there is a gap between a lower edge of the mounting plate and a bottom wall of the case body; and a side of the microphone shell is connected to an inner side wall of the case body and the mounting plate respectively.

5. The directional microphone receiver according to claim 2, wherein the case body is a sound transmission cover, or is composed of a plurality of sound transmission brackets.

6. The directional microphone receiver according to claim 3, wherein the microphone shell is in interference fit or is bonded via curable adhesive with the case body and the mounting plate.

7. The directional microphone receiver according to claim 2, wherein the cover plate is a steel sheet with a thickness of 0.2 mm.

8. The directional microphone receiver according to claim 2, wherein the case body is made of an elastic material or a plastic material.

9. A sound device, comprising the directional microphone receiver according to claim 1.

10. The directional microphone receiver according to claim 3, wherein the directional microphone receiver further comprises a mounting plate, which is provided in the case body; an upper edge of the mounting plate is connected to the cover plate, and there is a gap between a lower edge of the mounting plate and a bottom wall of the case body; and a side of the microphone shell is connected to an inner side wall of the case body and the mounting plate respectively.

11. The directional microphone receiver according to claim 3, wherein the case body is a sound transmission cover, or is composed of a plurality of sound transmission brackets.

12. The directional microphone receiver according to claim 3, wherein the cover plate is a steel sheet with a thickness of 0.2 mm.

13. A sound device, comprising the directional microphone receiver according to claim 2.

14. A sound device, comprising the directional microphone receiver according to claim 3.

15. A sound device, comprising the directional microphone receiver according to claim 4.

* * * * *